(12) United States Patent
Sowul et al.

(10) Patent No.: US 7,695,399 B2
(45) Date of Patent: Apr. 13, 2010

(54) PINION PIN SECUREMENT APPARATUS FOR A PLANETARY CARRIER ASSEMBLY

(75) Inventors: Henryk Sowul, Novi, MI (US); Anatoly Filanovsky, Farmington Hills, MI (US); Michael B. Solt, Beverly Hills, MI (US); Fredrick R. Poskie, Plymouth, MI (US); James W. Haynes, Saline, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 1010 days.

(21) Appl. No.: 11/032,790

(22) Filed: Jan. 11, 2005

(65) Prior Publication Data

US 2006/0154778 A1 Jul. 13, 2006

(51) Int. Cl.
*F16H 3/44* (2006.01)
(52) U.S. Cl. ...................................... 475/331
(58) Field of Classification Search ................. None
See application file for complete search history.

(56) References Cited

U.S. PATENT DOCUMENTS

| 2,496,928 | A | * | 2/1950 | Bing et al. | 403/230 |
| 4,901,601 | A | * | 2/1990 | Leggat | 475/348 |
| 4,998,909 | A | * | 3/1991 | Fuehrer | 475/331 |
| 5,928,105 | A | * | 7/1999 | Taha et al. | 475/331 |
| 6,918,853 | B2 | * | 7/2005 | Tanikawa | 475/348 |

* cited by examiner

*Primary Examiner*—Richard M. Lorence
*Assistant Examiner*—Edwin A. Young

(57) ABSTRACT

A planet carrier assembly has a plurality of pinion gears rotatably mounted on pinion pins, each pin having a slot formed thereon. A locator ring is assembled onto the pinion pins and rotated in a manner such that the locator ring engages the slots in the pinion pins and a plurality of tabs and protuberances engage complementary components formed on a housing member of the planet carrier assembly. The locator ring ensures both axial and rotational positioning of the pinion pins within the planet carrier housing.

4 Claims, 4 Drawing Sheets

PINION PIN SECUREMENT APPARATUS FOR A PLANETARY CARRIER ASSEMBLY

TECHNICAL FIELD

This invention relates to planet carrier assemblies and, more particularly, to a securement pinion pin in such planetary assemblies.

BACKGROUND OF THE INVENTION

Planet carrier assemblies that are used in planetary gear transmissions have a carrier or case in which a plurality of pinion gears are rotatably mounted on pinion pins. It is preferable that the pinion pins be secured from movement in the planet carrier both axially and rotatably.

One method of securing the pinion pins in the planet carrier is the process of staking. Staking requires relatively high pressing forces to be used to reshape the outer surface of the pinion pin into an interference with the planet carrier. This high pressing force can result in some distortion to the carrier thereby leading to undesirable noise within the planetary system. Since the pinion gears are normally mounted on needle bearings on the pinion pins, very low friction forces are present to cause rotation of the pinion pins.

Another process for retaining the pinion pins within the carrier is welding, which of course applies some heat to the carrier and pin during the welding process. However, this process is effective in preventing pin movement relative to the carrier housing or case.

A further method is the use of locking rings, which surround each pinion pin and thereby prevents axial movement. However, the locking rings do not necessarily prevent rotational movement relative to the case.

SUMMARY OF THE INVENTION

It is an object of the present invention to provide an improved apparatus for securing pinion pins within the planet carrier assembly.

In one aspect of the present invention, the pinion pins of a planet carrier include a notch or slot, which is engaged by a periphery of a locator ring to prevent axial and annular movement of the pinion pins.

In another aspect of the present invention, the locator ring has formed thereon a tab, which engages a portion of the planet carrier to limit axial movement of the locator ring relative to the carrier housing.

In yet another aspect of the present invention, the locator ring has a plurality of protuberances formed thereon which engage indentations in the carrier housing to assist in preventing movement of the locator ring after assembly.

In still another aspect of the present invention, the locator ring is assembled on the planet carrier and then rotated into position to provide for engagement of the various components thereof with the planet carrier housing.

DESCRIPTION OF THE EXEMPLARY EMBODIMENTS

Figure 1A:
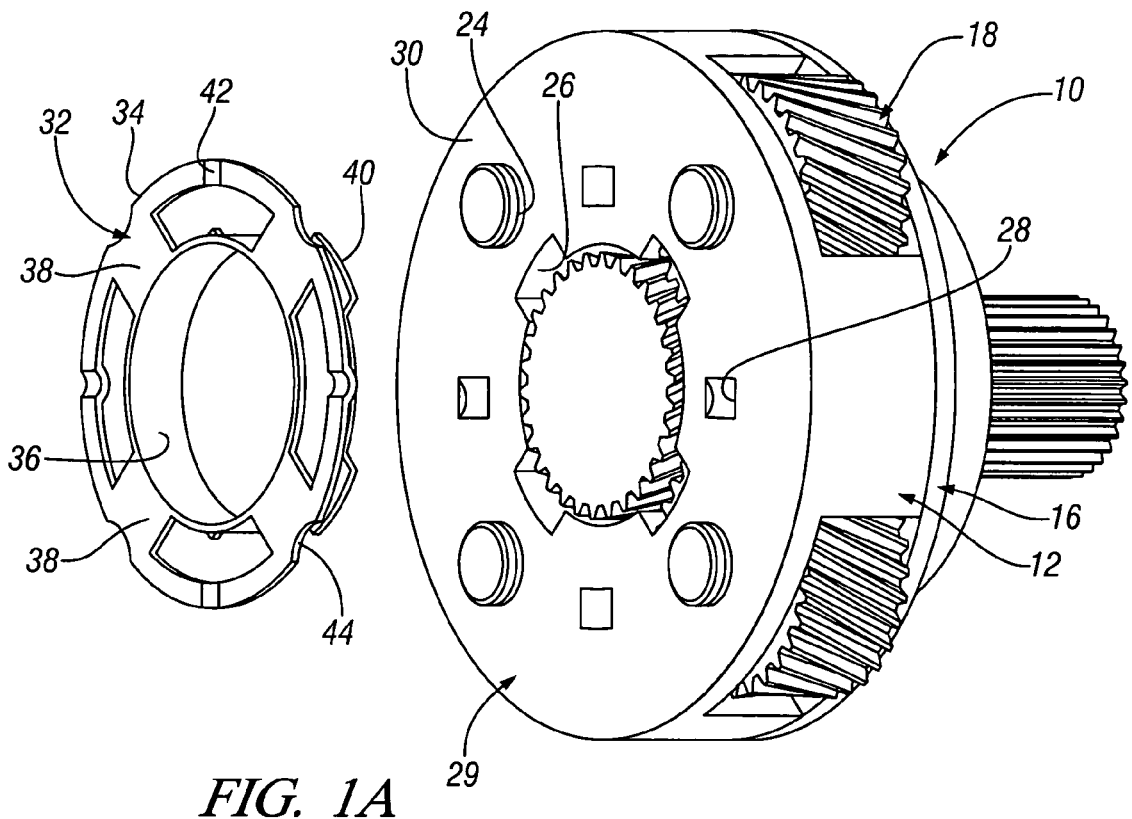
FIG. 1A is an isometric view of a planet carrier assembly in an exploded view of the locator ring.

Referring to the drawings, wherein like characters represent the same or corresponding parts throughout the several views, there is seen in FIG. 1 a planet carrier assembly 10, which has a planet carrier housing 12 formed of a pair of housing members 14 and 16. The planet carrier assembly also includes a plurality of pinion gears 18, which are rotatably mounted on pinion pins 20. The pinion pins 20 are placed in apertures 22 formed in the housing members 14 and 16. The pinion gears 18 are rotatably mounted on the pinion pins 20 on conventional needle bearings, not shown.

Figure 1B:
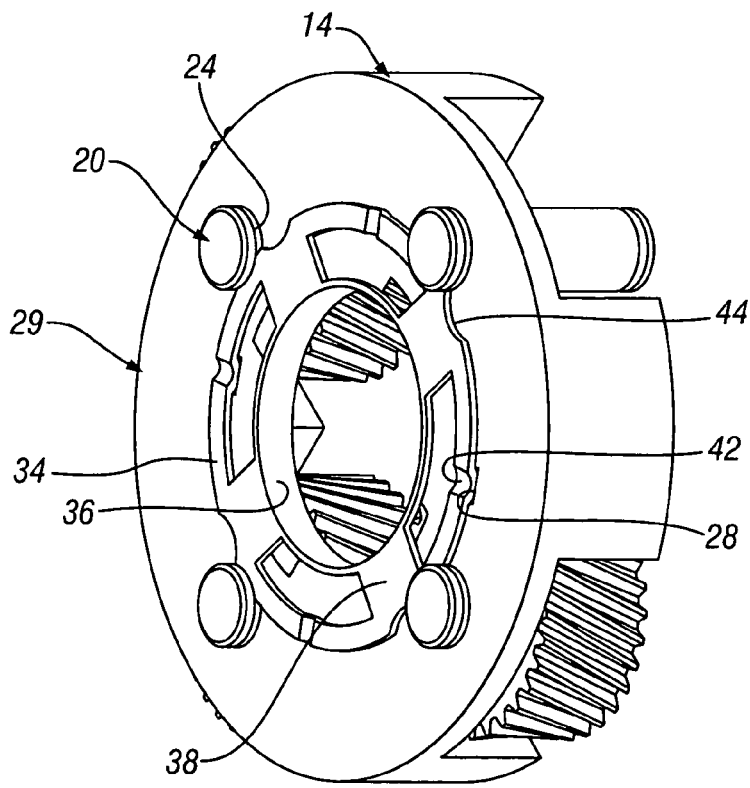
FIG. 1B is an isometric view of a portion of the planet carrier with the locator ring installed.
Figure 2:
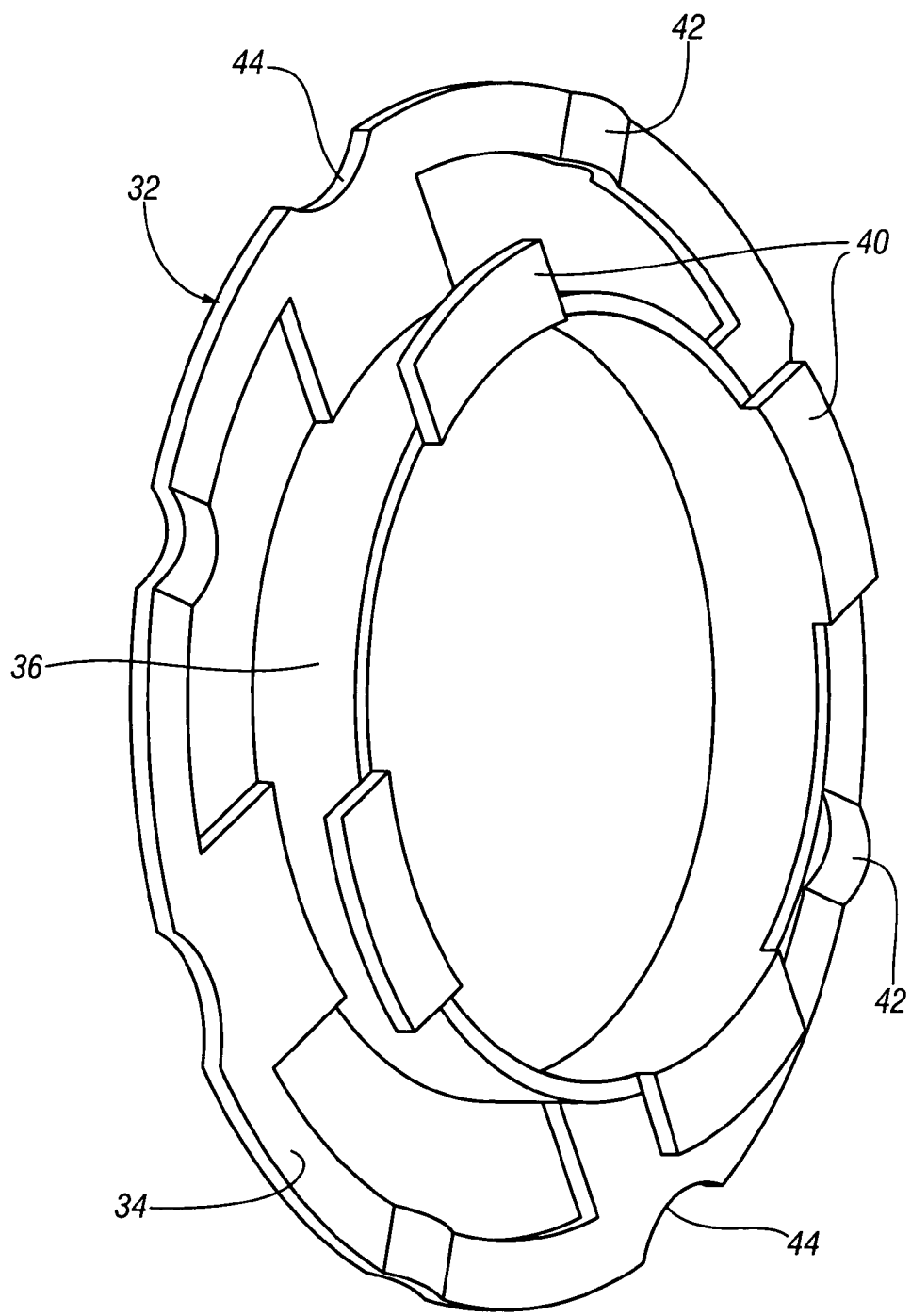
FIG. 2 is an isometric view of a locator ring.

Each pinion pin 20 has formed therein a slot 24, which is disposed to face radially inward, as seen in FIGS. 1A and 1B. The housing member 14 has formed therein a plurality of slots 26, which extend through a housing wall 29 and a plurality of cavities 28 formed in an outer surface 30 of the housing member 14.

Figure 3:
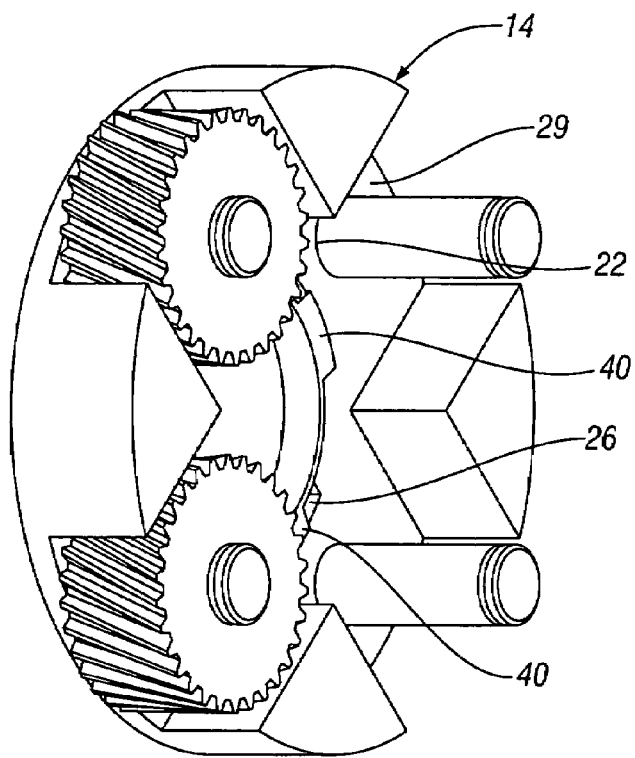
FIG. 3 is an isometric view of a portion of the carrier assembly with the locator ring in position.

A locator ring 32 is assembled onto the planet carrier housing member 14. The locator ring 32 has an outer rim or ring 34, an inner rim or ring 36, and a plurality of connecting radial arms 38. The inner ring 36 has formed thereon a plurality of tabs 40, which as seen in FIG. 3 extend through the slots 26. The outer ring 34 has formed thereon a plurality of protuberances 42 and a plurality of recesses 44.

During assembly, the pinion pins 20 are placed in the housing members 14 and 16 with the pinion gears and needle bearings assembled thereon. The locator ring 32 is then assembled onto the housing member 14 with the tabs 40 extending through the slots 26, the recesses 44 extending over the ends of pins 20, and the protuberances 42 being angularly disposed relative to the cavities 28. After assembly in this fashion, the locator ring 32 is rotated clockwise as seen in FIG. 1B until the outer ring 34 engages in the slots 24, the protuberances 42 engage in the cavities 28, and the tabs 40 engage the inner surface of the housing 14 adjacent the slots 26. This attachment of the locator ring prevents the pinion pins 20 from either axial movement or rotational movement relative to the planet carrier housing 12. The locator ring 32 is retained in position by the protuberances 42 engaged in the cavities 28 and the tabs 40 engaging the inner surface of the housing member 14.

Figure 4:
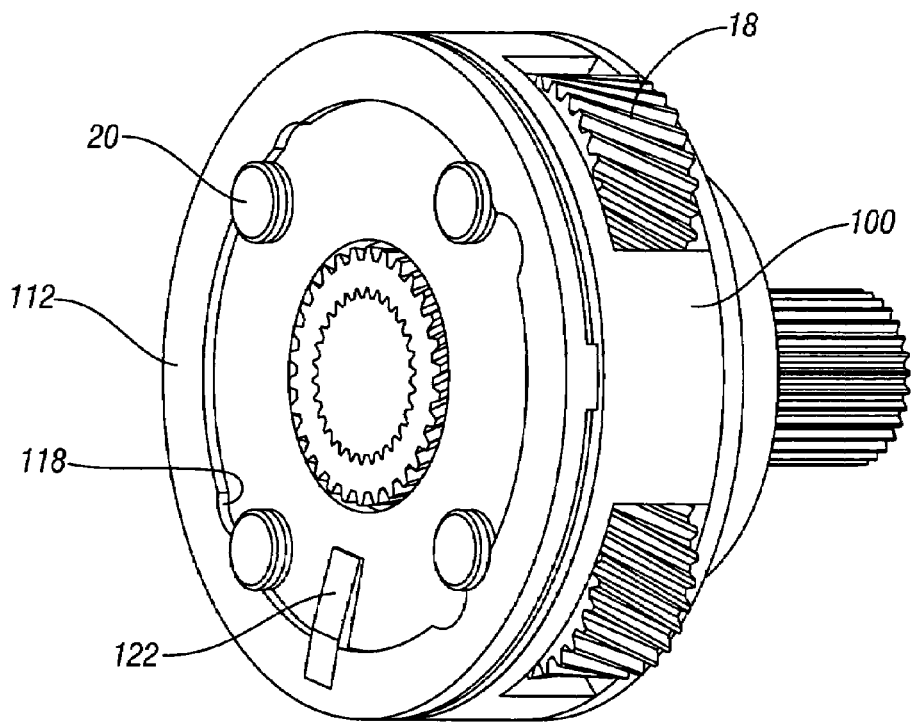
FIG. 4 is an isometric view of another embodiment of a planet carrier assembly with a locator ring installed.
Figure 5:
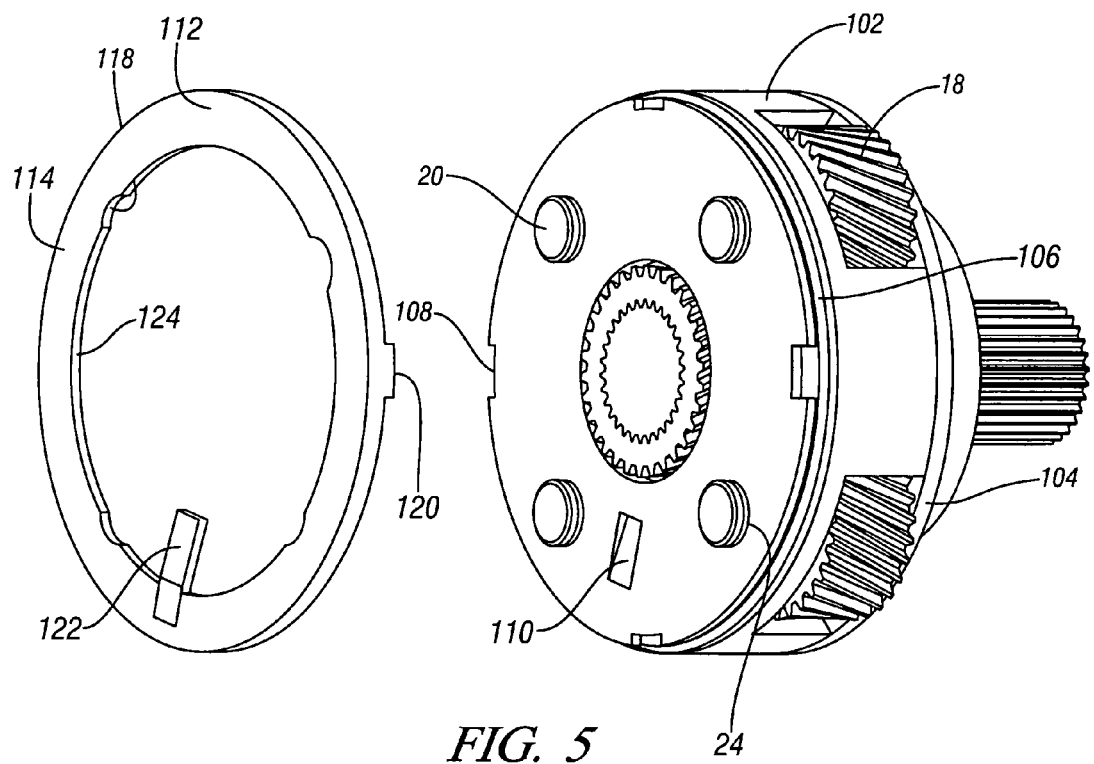
FIG. 5 is a partially exploded view of the embodiment shown in FIG. 4.
Figure 6:
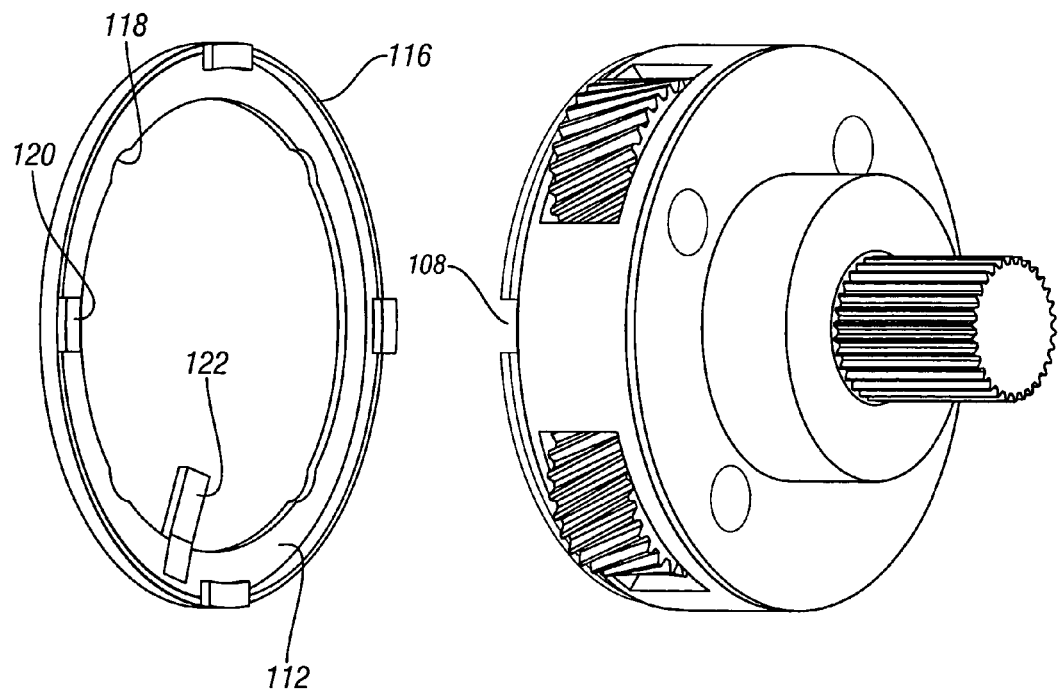
FIG. 6 is an exploded isometric view of the embodiment shown in FIG. 4.

An alternative embodiment of the present invention is shown in FIGS. 4, 5, and 6.

A carrier assembly 100, shown in FIGS. 4 through 6, includes a pair of housing members 102 and 104 in which a plurality of pinion gear members 18 are rotatably supported on pinion pins 20. The pinion pins 20 each have a groove or slot 24. The housing member 102 includes a groove 106 formed in the outer periphery thereof, which communicates with a plurality of slots 108. The housing member 102 also has formed therein at least one cavity 110. More than one cavity can be provided, if desired.

A locator ring 112 has an annular portion 114 and an outer rim portion 116. The annular portion 114 has formed therein a plurality of recesses 118, which face radially inward on the annular portion 114. The outer rim portion 116 has formed integral therewith a plurality of tabs or protuberances 120, which are parallel with but axially offset from the annular portion 114. Extending radially inward from the annular portion 114 is a tab member 122, which is essentially the same size as the cavity 110.

During assembly, the locator ring 112 is mounted onto the carrier assembly 100 with the recesses 118 passing over respective pins 20 and engaging within the slots 24, which have been manipulated to face radially outward. Also at assembly, the tabs or protuberances 120 pass through the slots 108 and into the groove 106. The tab 122 is angularly offset from the cavity 110.

To finalize the assembly, the locator ring 112 is rotated clockwise, as seen in FIG. 4, until the inner surface 124 of the annular portion 114 engages in the slots 24, the tab 122 is disposed within the cavity 110, and the tabs or protuberances 120 are engaged within the groove 106 and displaced from the slots 108. The locator ring 112 is thus secured on the housing 102 in a manner to prevent axial and rotational movement of the pins 20 relative to the housing member 102.

The invention claimed is:

1. A planet carrier assembly comprising:
    a housing member;
    a plurality of pinion pins disposed in said housing member and rotatably supporting pinion gear members;
    said housing member having formed thereon a housing slot and a cavity;
    a locator ring mounted on said housing in a position to engage pinion slots formed in each of said pinion pins, said locator ring including an inner rim having tab members formed thereon for engaging said housing slot and said locator ring including protuberances formed thereon for engaging said cavity.

2. The planet carrier assembly defined in claim 1 further wherein:
    said tab members are disposed to engage an inner surface of said housing member, an outer rim of said locator ring is disposed to engage said pinion slots on said pinion pins.

3. The planet carrier assembly defined in claim 2 wherein said tab members are axially displaced from said outer rim.

4. The planet carrier assembly defined in claim 1 further wherein:
    said locator ring has an inner surface disposed in engagement with said pinion slots formed on said pin members, said housing slot is formed radially along an outside surface of said housing member and is engaged by said tab members on said locator ring, and said protuberances extend radially inward from said locator ring.

* * * * *